Jan. 9, 1968  D. C. MURPHY  3,362,397
WEED BURNER

Filed May 18, 1965

Jan. 9, 1968   D. C. MURPHY   3,362,397
WEED BURNER
Filed May 18, 1965   2 Sheets-Sheet 2
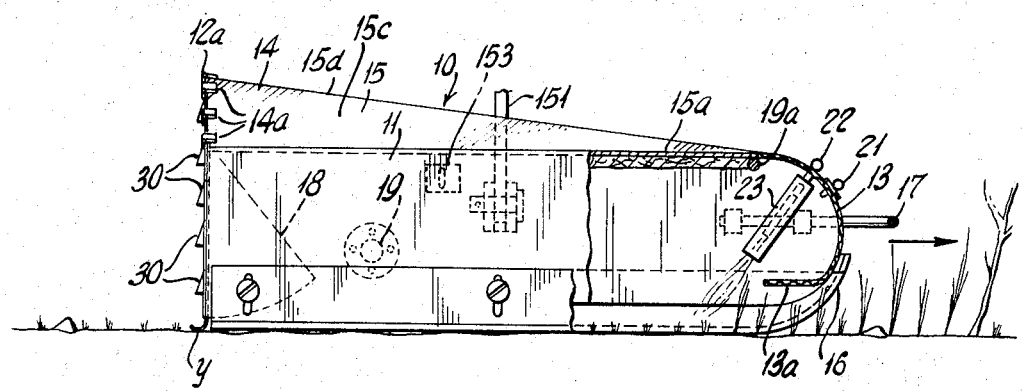
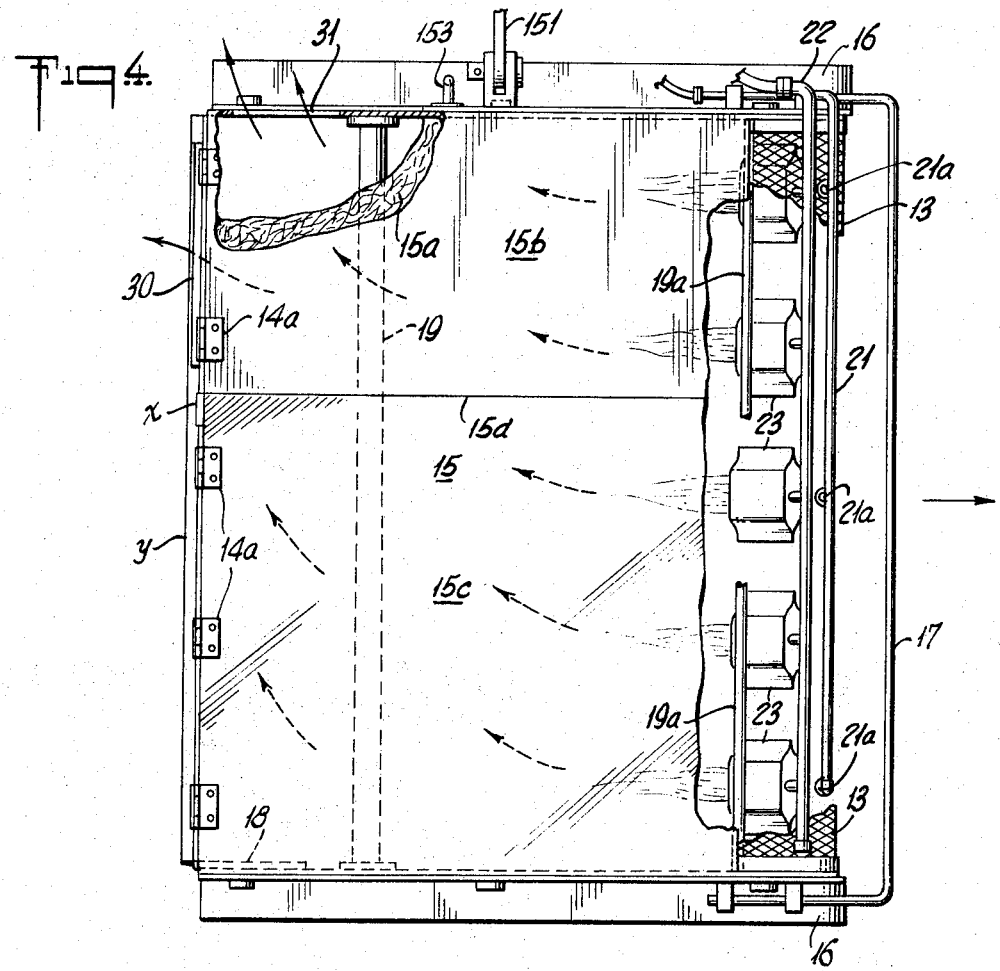

United States Patent Office 3,362,397
Patented Jan. 9, 1968

3,362,397
WEED BURNER
Dudley C. Murphy, Tulsa, Okla., assignor to Texaco Inc., New York, N.Y., a corporation of Delaware
Filed May 18, 1965, Ser. No. 456,643
6 Claims. (Cl. 126—271.2)

This invention relates generally to weed burners and particularly to gas-fired weed burners with enclosing sides and top for specific use in citrus groves and orchards, wherein exists the problem of cultivating beneath low lying foliage and close to immature trees.

Flame cultivation is particularly desirable and effective in open fields where the heated gases of combustion may be dissipated readily and where there is no problem of heat damage to the feeder roots of the plants in the fields to be cultivated. In confined areas (e.g., orchards) and, where the feeder roots of trees approach the surface from which it is desired to eradicate undesirable growth, there are the additional problems of preventing heat damage to low lying foliage and to tree bark. Since the propagation of citrus plants occurs in subtropical climate where heavy weed growth is prevalent, extensive cultivation of fields where young citrus trees have been set out is required to prevent the consumption of desired moisture and plant food needed by citrus trees, either young or old. In addition, the heavy cost of labor for cultivation by tilling the soil forces the practice of flame cultivation with resultant economy in time and money.

Among the requirements for effective orchard weed burners are that the flame of combustion be directed downwardly in a manner such as to destroy the undesirable growth and to have the heat of combustion removed from the weed burner so as to avoid scorching of the foliage of the tree branches, i.e., the burner should be designed to contain the scorching gas flames and to vent the exhaust gases away from tree foliage. In addition, the weed burner should have the flexibility to permit coupling to either side or back of a tractor, have means to quench any residual flame or embers after the weed burner has passed, and a structure to prevent burner flame-out due to erratic wind conditions. Thus, a hooded weed burner which is able to reach under the larger tree boughs and get close enough to the smaller trees to kill the heavy weed growth without damaging the foliage, fruit, wood or surface feeder root systems is most desirable.

Accordingly, an object of this invention is to provide an improved gas-fired weed burner which will injure neither the foliage nor the surface feeder roots of trees in an orchard.

Another object of the invention is to provide a weed burner having improved exhaust means to vent heated gases away from the foliage and trunk of orchard trees.

Still another object of the invention is to provide an improved weed burner having a novel air intake for the burners in combination with novel exhaust means for the gases of combustion.

These and other objects, features and advantages of the present invention will become apparent from the following description and claims and by reference to the accompanying drawings wherein:

FIG. 3 is a side view, partly in section, from the smaller side of the burner, showing the upward and rearward taper of the insulated top of the weed burner; and FIG. 4 is a plan view, partly in section, of the improved weed burner.

The objects of the present invention are achieved by an improved construction of an enclosed weed burner to provide a directing structure for the exhaust passage of hot gases of combustion in combination with improved air intake means.

Figure 1:
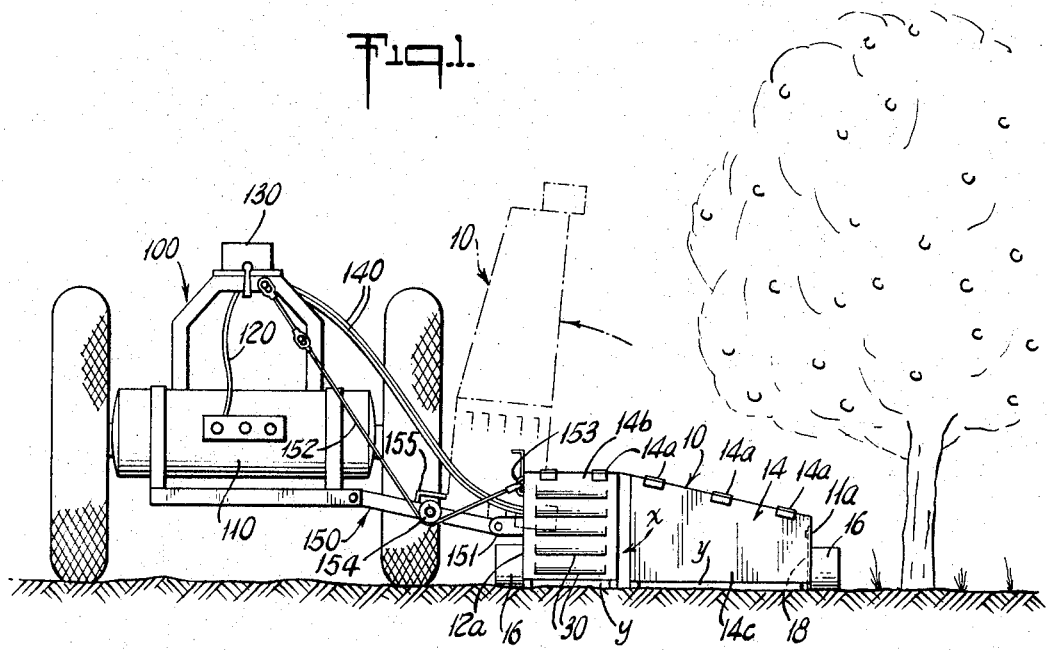
FIG. 1 is an elevation view from the rear showing the improved weed burner hitched to the right side of a tractor carrying the fuel tank.

Referring to FIG. 1 of the drawing, there is disclosed the improved weed burner 10 hitched to the right hand side of tractor 100, holding the supply of fuel, as in the LPG container 110. A fuel supply line 120 leads to the controls 130, regulating fuel flow through lines 140 to the burner 10. Shown in dotted lines in this figure is the position for transporting the weed burner from field to field. A lift mechanism is shown generally at 150, comprising the pivoted support member 151, the lifting cable 152 joined to the burner at 153 and passing around the roller 154, so that the burner may be raised out of contact with the ground for traveling between jobs, being supported on stop 155.

Figure 2:
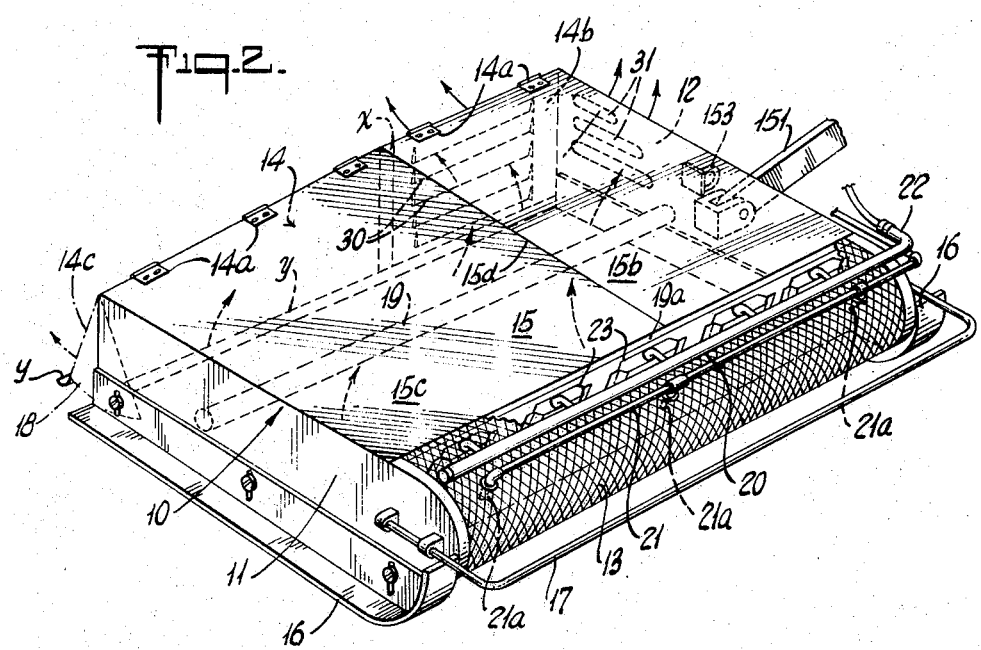
FIG. 2 is a perspective view, partly in section, of the improved weed burner, with dashed arrows showing the exit flow of the heated gases of combustion.

FIG. 2 discloses details of the burner which includes the housing comprising the smaller side 11 and the larger side 12, the forward or air intake end 13 and the rear or exit end 14, and an insulated top 15. Also disclosed are the side-supported skid runners at 16, a side-supported, forwardly extending weed depresser 17, and an apron-like segment 18 projecting from the rear end 14 into contact with the smaller side 11 to prevent unwanted escape of hot gases on the smaller or lower side of the burner, the positions of both the skid runners and weed depresser being adjustable. The sides are kept in spaced apart position by the supporting rods 19 and 19a, aided by the burner manifold complex, indicated generally at 20. These supporting rods are disclosed also in FIG. 4.

Referring now to FIGS. 2, 3 and 4 for a further description of the burner manifold complex, a pilot burner manifold 21 leads to a plurality of pilot burners 21a, shown here as three in number, the number being determined by the number of burners installed. The main burner manifold 22 leads to a plurality of burners 23, disclosed here as five in number, the number being determined by the width of burner desired. These burners are inclined downwardly and rearwardly to direct the flames most efficiently, and in cases where the side dimensions are short, a flame deflector plate (not shown) may be positioned adjacent supporting rod 19 to prevent the flame from issuing from the rear end.

FIGS. 2 and 3 disclose the grille structure of the front end defining air intake means and can be manufactured effectively from expanded metal grating or screen material. This grille structure encloses and is wound around the burner manifold complex so as to project underneath as shown at 13a, FIG. 3 and with its open network structure, and the action of the weed depresser which bends the upwardly projecting overgrown weeds out of the way of the towed burner, permits easy entry of air to provide for effective combustion of gas at the burners. The smaller end 11 has a uniform width or depth fore and aft, while the larger end at 12 starts at its front part with a depth equal to that of the smaller end 11 and gradually increases in depth to the rear corner dimension shown at 12a, FIGS. 1 and 3.

The rear end 14 is movably attached, as by hinges 14a, to the insulated top 15 and is formed preferably of two sections 14b and 14c, to conform with the configuration of the cross section at the rear of the burner housing. The rear end increases in depth from that equal to that of the smaller end at corner 11a, FIG. 1, to a depth equal to that of the rear corner of the larger end. Because of the different axes of rotation of the two sections of the rear end, it is necessary that some clearance exist between them, shown exaggerated at x, FIGS. 1 and 2, or that the inside edge of section 14b overlap the corresponding edge of section 14c, to prevent undue interference between these sections as they open when the weight and wearpiece members y, FIGS. 1, 3 and 4, along the bottom edges of these sections, pass over obstructions when the weed burner is drawn along over uneven ground.

The top 15 has insulation at 15a, FIG. 4, and is defined by a compound, upwardly tapered, cover structure to provide a chimney-like effect to direct gases for exhaust away from the smaller end of the burner housing. The top includes a plain section 15b which tapers upwardly and rearwardly from the front end to the rear end section 14b so that this rear end section is substantially rectangular and has a depth equal to that of the rear corner 12a. The other section 15c of the top tapers both from the front end and from the smaller side to the rear end section 14c and to the plain top section 15b which it joins along line 15d, to provide a compound cover surface tapering from the depth of the front end of the lower side toward the depth of the inner edge of the rear end section 14b. Thus, the rear end section 14c is trapezoidal and has a pivotal axis at an angle to that of the pivotal axis of section 14b, therefore requiring either a clearance between these sections or a tolerable overlap. This upwardly tapered construction of the cover leads hot gases away from the smaller end or low side of the burner, which side, when in use, is adjacent the tree trunk and under low hanging foliage, and leads the hot gases to a chute or vent hood defined by the plain top section 15b and the larger side 12. To complete the exhaust structure, as seen in FIGS. 2 and 4, rear end section 14b has a series of louvers 30 adjacent the rear corner and extending from the top to the bottom of this section, while the larger side 12 has a complementary series of louvers 31 adjacent the same rear corner to permit air exhaust flow of hot gases of combustion from the burner housing. These louvers also prevent winds from affecting the burner operation during breezy spells. When necessary to have all the exhaust gases vented to the rear, the louvers in the larger side could be eliminated, or alternatively, the opening of these louvers could be made adjustable.

In addition, should the wearpieces be found not to be effective as a fire drag in smothering sparks among the burned weeds to prevent possible fires after the weed burner has completed its pass, a steel drag chain (not shown) could be attached to the rear of the burner housing.

Thus, there has been shown and described a novel weed burner having a housing with a low angular silhouette defined by an upwardly and rearwardly extending insulated top in combination with a complementary side and rear member having vents adjacent the corner of intersection of these members to provide an exhaust passage for hot gases away from the low side of the burner housing, thereby permitting flame cultivation beneath the foliage and adjacent the trunks of low canopied tree growths.

Other modifications and variations of the invention, as hereinbefore set forth, may be made without departing from the spirit and scope thereof, and therefore, only such limitations should be imposed as are indicated in the appended claims.

I claim:

1. A housing for enclosing weed burners having means for attachment to a vehicle comprising a pair of side walls, a pair of end walls and a top wall all joined to each other, one end wall of said pair of end walls being adjacent the enclosed burners and having air inlet means, the other end wall of said pair of end walls and one side wall of said pair of side walls supporting said means for attachment meeting at a corner and each of these walls having openings adjacent said corner and said top and spaced from said burners to permit the exhaust of combustion gases therethrough.

2. A burner housing as defined in claim 1, said air inlet means comprising a grille structure.

3. In an enclosed weed burner having means for attachment to an automotive vehicle, side walls, end walls and a covering top intersecting with each other and enclosing the burners therein, one side wall supporting said means for attachment and one end wall both having dimensions to provide at their intersection a corner having a depth greater than that of the adjacent corner defined by the intersection of said one end wall with the other of said side walls, said one side wall and said one end wall having openings adjacent their intersection and said covering top and located away from said burners for ventilation of exhaust gases therethrough, the other end wall being adjacent said burners within said housing and having openings defining air intake means.

4. In a burner as defined in claim 3, said one end wall being joined to said top for pivotal movement with respect thereto and also having a projecting segment in contact with said other side wall for maintaining the enclosure thereat during said pivotal movement of said one end wall.

5. In a weed burner as defined in claim 3, said covering top comprising a plain section adjacent said one side wall and extending end wall to end wall and a compound section extending from said other end wall and from said other of said side walls to intersect with said plain section, said other of said side walls having a uniform depth from end wall to end wall.

6. In combination with a motive vehicle, attached thereto comprising a low silhouette housing having ends, sides, and an insulated top, and a plurality of burners enclosed therewithin, with one end of said housing having a plurality of openings defining an air inlet, means supported by said sides for depressing obstructions to said air inlet as said weed burner is moved, skid means adjustably fastened to said sides, the other end of said housing being movably joined to said top and including a projecting apron-like segment in contact with the side spaced from said vehicle, the side adjacent said vehicle and said other end intersecting at a corner of greater depth than that of the opposite corner defined by the intersection of said side spaced from said vehicle with said other end, the improvement comprising an exhaust structure defined by said side adjacent said vehicle and said top to form a chute and with a plurality of openings in said last mentioned side and said other end adjacent said corner of greater depth and said top providing a channel of communication from said air inlet at said other end.

References Cited
UNITED STATES PATENTS

| | | | |
|---|---|---|---|
| 625,711 | 5/1899 | Stevens | 126—271.2 |
| 1,295,694 | 2/1919 | Chausse | 126—271.2 |
| 1,564,213 | 12/1925 | Denker | 126—271.2 |
| 2,548,065 | 4/1951 | Reister | 126—271.2 |

CHARLES J. MYHRE, *Primary Examiner.*